(12) United States Patent
Clark

(10) Patent No.: US 7,703,548 B2
(45) Date of Patent: Apr. 27, 2010

(54) MAGNETIC RANGING WHILE DRILLING PARALLEL WELLS

(75) Inventor: Brian Clark, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 247 days.

(21) Appl. No.: 11/833,032

(22) Filed: Aug. 2, 2007

(65) Prior Publication Data

US 2008/0041626 A1 Feb. 21, 2008

Related U.S. Application Data

(60) Provisional application No. 60/822,598, filed on Aug. 16, 2006.

(51) Int. Cl.
*E21B 47/022* (2006.01)

(52) U.S. Cl. ...................................... 175/45

(58) Field of Classification Search .................. 175/26, 175/45, 61, 62; 166/66.5
See application file for complete search history.

(56) References Cited

U.S. PATENT DOCUMENTS

| | | | |
|---|---|---|---|
| 3,853,185 A | 12/1974 | Dahl | |
| 4,323,848 A | 4/1982 | Kuckes | |
| 4,372,398 A | 2/1983 | Kuckes | |
| 4,443,762 A | 4/1984 | Kuckes | |
| 4,529,939 A | 7/1985 | Kuckes | |
| 4,593,770 A | 6/1986 | Hoehn, Jr. | |
| 4,700,142 A | 10/1987 | Kuckes | |
| 4,791,373 A | 12/1988 | Kuckes | |
| 4,845,434 A | 7/1989 | Kuckes et al. | |
| 4,933,640 A | 6/1990 | Kuckes | |
| 4,957,172 A | 9/1990 | Patton et al. | |
| 5,074,365 A | 12/1991 | Kuckes | |
| 5,131,477 A | 7/1992 | Stagg et al. | |
| 5,218,301 A | 6/1993 | Kuckes | |
| 5,258,755 A | 11/1993 | Kuckes | |
| 5,305,212 A | 4/1994 | Kuckes | |
| 5,323,856 A | 6/1994 | Davis et al. | |
| 5,343,152 A | 8/1994 | Kuckes | |
| 5,485,089 A | 1/1996 | Kuckes | |

(Continued)

FOREIGN PATENT DOCUMENTS

WO          9845733          10/1998

OTHER PUBLICATIONS

A. Kuckes et al., "New Electromagnetic Ranging/Surveying Method for Drilling Parallel Horizontal Twin Wells," SPE Drilling and Completion, pp. 85-90 (Jun. 1996).

(Continued)

*Primary Examiner*—William P Neuder
(74) *Attorney, Agent, or Firm*—David J. Smith

(57) ABSTRACT

Methods are disclosed for drilling a first well and a second well. The method includes measuring direction and inclination for at least one of the bottom hole assemblies (BHAs) in the wells, generating a magnetic field in at least one of the BHAs and measuring the magnetic field at the other BHA. The method includes determining the geometrical relationship of one BHA with respect to the other BHA. The method further includes determining the position of one BHA with respect to the Earth's geology or geometry. The method further includes automatically positioning one well with respect to the other well to maintain a predetermined geometrical relationship between them.

65 Claims, 12 Drawing Sheets

U.S. PATENT DOCUMENTS

| | | |
|---|---|---|
| 5,512,830 A | 4/1996 | Kuckes |
| 5,513,710 A | 5/1996 | Kuckes |
| 5,515,931 A | 5/1996 | Kuckes |
| 5,589,775 A * | 12/1996 | Kuckes ............... 324/346 |
| 5,657,826 A | 8/1997 | Kuckes |
| 5,676,212 A | 10/1997 | Kuckes |
| 5,720,355 A | 2/1998 | Lamine et al. |
| 5,725,059 A | 3/1998 | Kuckes et al. |
| 5,923,170 A | 7/1999 | Kuckes |
| 5,960,370 A | 9/1999 | Towle et al. |
| RE36,569 E | 2/2000 | Kuckes |
| 6,736,222 B2 | 5/2004 | Kuckes et al. |
| 6,927,741 B2 | 8/2005 | Brune et al. |
| 6,991,045 B2 | 1/2006 | Vinegar et al. |
| 2002/0130663 A1 | 9/2002 | Kuckes et al. |
| 2003/0014873 A1* | 1/2003 | Towle ............... 33/304 |
| 2003/0085059 A1 | 5/2003 | Kuckes et al. |
| 2003/0188891 A1 | 10/2003 | Kuckes |
| 2004/0040745 A1 | 3/2004 | Kuckes |
| 2006/0124360 A1* | 6/2006 | Lee et al. ............... 175/61 |
| 2007/0278008 A1* | 12/2007 | Kuckes et al. ............... 175/40 |

OTHER PUBLICATIONS

T.L. Grills et al., "Magnetic Ranging Technologies for Drilling Steam Assisted Gravity Drainage Well Pairs and Unique Well Geometries—A Comparison of Technologies," SPE Paper 79005 (Nov. 4-7, 2002).

C.R. Mallary et al., "Collision Avoidance using a Single Wire Magnetic Ranging Technique at Milne Point, Alaska," IADC/SPE Paper 39389 (Mar. 3-6, 1998).

F. Leraand et al., "Relief Well Planning and Drilling for a North Sea Underground Blowout," J. Petroleum Technology, p. 266 (Mar. 1992).

Y.L. Hello et al., "Stopping a Water Crossflow in a Sour Gas Producer Well," IADC/SPE 39396 (Mar. 1996).

B.A. Tarr, "Use of a New Ranging Tool to Position a Vertical Well Adjacent to a Horizontal Well," SPE 20446, p. 93 (Jun. 1992).

R. Kroll et al., "Drilling Engineering Challenges in Commercial SAGD Well Design in Alberta," SPE 62862 (Jun. 2000).

D. Lee et al., "U-Tube Wells-Connecting Horizontal Wells End to End. Case Study: Installation and Well Construction of the World's Firsts U-Tube Well," SPE/IADC 92685 (Feb. 2005).

* cited by examiner

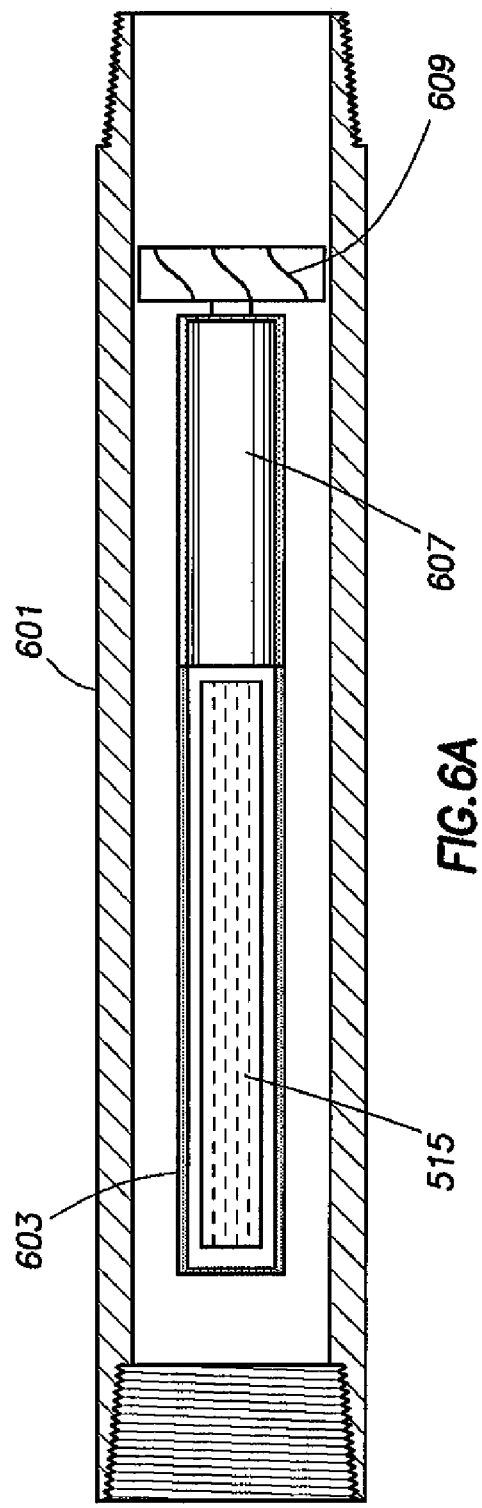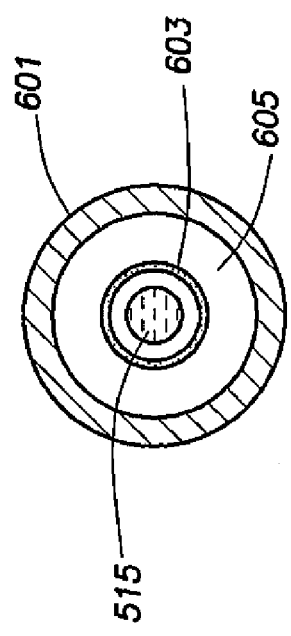

MAGNETIC RANGING WHILE DRILLING PARALLEL WELLS

RELATED APPLICATIONS

The present application claims priority to U.S. Provisional Patent Application Ser. No. 60/822,598, filed Aug. 16, 2006, entitled "Magnetic Ranging While Drilling Parallel Wells." The present application may be related to U.S. patent application Ser. No. 11/550,839, filed Oct. 19, 2006, entitled "Method and Apparatus for Locating Well Casings from an Adjacent Wellbore;" and U.S. patent application Ser. No. 11/781,704, filed Jul. 23, 2007, entitled "Method for Optimizing Magnetic Signals and Detecting Casing."

BACKGROUND

Various techniques have been employed to drill, for example, a pair of parallel wells 102, 104 for Steam Assisted Gravity Drainage (SAGD) applications, as shown in FIG. 1. An important objective when drilling such wells is to achieve proper placement of each well relative to each other. As used herein, the term "first" horizontal well is used to refer to well 102 to be first drilled (and in the prior art completed first), usually the lower producer well. In various embodiments, the "first" well 102 may be drilled slightly ahead of the second well. In contrast, the "second" well refers to the well 104 that is the upper well, completed second in the prior art.

Often a slant rig is employed to drill the shallow wells (a few hundred meters deep). With a slant rig, the drill pipe enters the ground at an angle of about 45°, so that the well can build quickly to 90°—i.e. horizontal. After being drilled in the desired zone, the first well 102 is completed with slotted liner and tubing. The slotted liner is typically 7 or 9⅝ inches in outer diameter (OD). The tubing is typically 3½ inches OD and extends to the toe of the well. A second tubing string might also be run to the heel of the producing well.

Referring now to FIG. 2, a wireline tool 202 is then deployed inside the tubing of well #1 102. The wireline tool 202 is required to determine the distance between the two wells 102, 104 and their relative location, information needed to steer the second well (#2) parallel to well #1. The bottom hole assembly 212 (BHA) in well #2 104 includes an measurement-while-drilling (MWD) tool 214 and a directional system 216, such as a steerable motor with bent sub, or a rotary steerable system.

There are two well-known magnetic ranging techniques utilizing a wireline tool inside tubing.

In the first technique, the wireline tool 202 produces a magnetic field ($\vec{B}$) that can be measured by the tool 214 in well #2 (see U.S. Pat. Nos. 5,485,089, RE 36,569, "New Electromagnetic Ranging/Surveying Method for Drilling Parallel Horizontal Twin Wells", A. Kuckes et al, SPE Drilling and Completion, June 1966, pages 85-90). The wireline tool 202 contains a large solenoid that produces a magnetic field with known strength and known field pattern. The tubing and slotted casing affect the magnetic field, but their effects can be removed by calibrating the solenoid inside the same size tubing and casing on the surface. The magnitude of the measured magnetic field indicates the separation of the two wells 102, 104, and the direction of the magnetic field indicates their relative positions.

Referring now to FIG. 3, in the second technique, strong permanent magnets are mounted in a near-bit sub 312 in well #2 104 while the wireline tool 302 contains magnetometers (see U.S. Pat. No. 5,589,775, "Magnetic ranging Technologies For Drilling Steam Assisted Gravity Drainage Well Pairs and Unique Well geometries—A Comparison of Technologies", T. L. Grills et al, SPE paper 79005, Nov. 4-7, 2002). The permanent magnets rotate with the drill bit, thus producing a rotating magnetic field. As the drill bit passes by the wireline magnetometers 302, the rotating magnets 312 produce an oscillating magnetic field inside the tubing. The distance between the wells 102, 104 is deduced from the variation in the magnetic field with measured depth of the drill bit. This approach has the drawback that the near-bit magnetic sub is located between the bent sub and the drill bit, reducing the steering capability of the system.

Other methods have been proposed, but are not favored in drilling SAGD wells.

The Single Wire Guidance™ System (see U.S. Pat. No. 5,074,365, "Collision Avoidance Using a Single Wire Magnetic Ranging Technique at Milne Point, Ak.", C. R. Mallary et al, IADC/SPE paper 39389, Mar. 3-6, 1998) involves a wire 402 carrying a current (I) to the toe of well #1 102, where the wire 402 is grounded to the casing 404 (FIG. 4). Most of the current returns to the surface through the well casing 404 and tubing 406; however, a very small amount of current leaks into the formation 200 at each foot along its length. The leakage current varies from foot to foot depending on the properties of the casing, the cement, and the formation resistivity. In general, the return current on the casing and tubing can be written as I'(z) where z is the measured depth. The net current along well #1 102 is I-I'(z). The net current is small, variable, and not well known. The net current produces an azimuthal magnetic field around the wellbore given approximately by $$\vec{B} = \frac{\mu_0 [I - I'(z)]}{2\pi r} \hat{n} \times \hat{r}$$

where $\vec{r}$ is the radial vector from the wire to the observation point, $r = |\vec{r}|$ is the magnitude of $\vec{r}$, $\hat{r} = \vec{r}/r$ is a unit vector that points from the wire to the observation point, $\hat{n}$ is a unit vector that points along the axis of the wire, and $\mu_0 = 4\pi \cdot 10^{-7}$ Henry/m is the permeability of vacuum. This magnetic field can be measured with three-axis magnetometers in the MWD tool 214 in well #2 104. The direction to the casing can be deduced from the three orthogonal components of the magnetic field. The distance to the cased well, however, is indeterminate without an accurate value for the leakage current versus depth, and there is no easy way to obtain I'(z).

A passive magnetic ranging technique involves inserting permanent magnets inside the steel casing. The permanent magnets are alternately magnetized N-S and S-N to create a discernable magnetic field pattern (U.S. Pat. No. 6,991,045). The magnetic field is measured by the MWD magnetometers, and the information employed to steer well #2. Afterwards, the permanent magnets must be recovered from the cased well.

The two standard magnetic ranging methods that require a wireline tool in the cased well are inefficient. Because the well is horizontal, the wireline tool must be pushed toward the well's toe as well #2 is progressively drilled. This requires a rig for well #1 just to move the wireline tool with drill pipe, or mud pumps to pump it down, or coiled tubing to push it down, or wireline tractor to pull it down. All of these methods are expensive and require additional equipment at the well site just to move the wireline tool.

BRIEF DESCRIPTION OF FIGURES

FIG. 6 shows a portion of the magnetic ranging tool of FIG. 5 with a solenoid assembly having a turbine generator.

DETAILED DESCRIPTION

Figure 1:
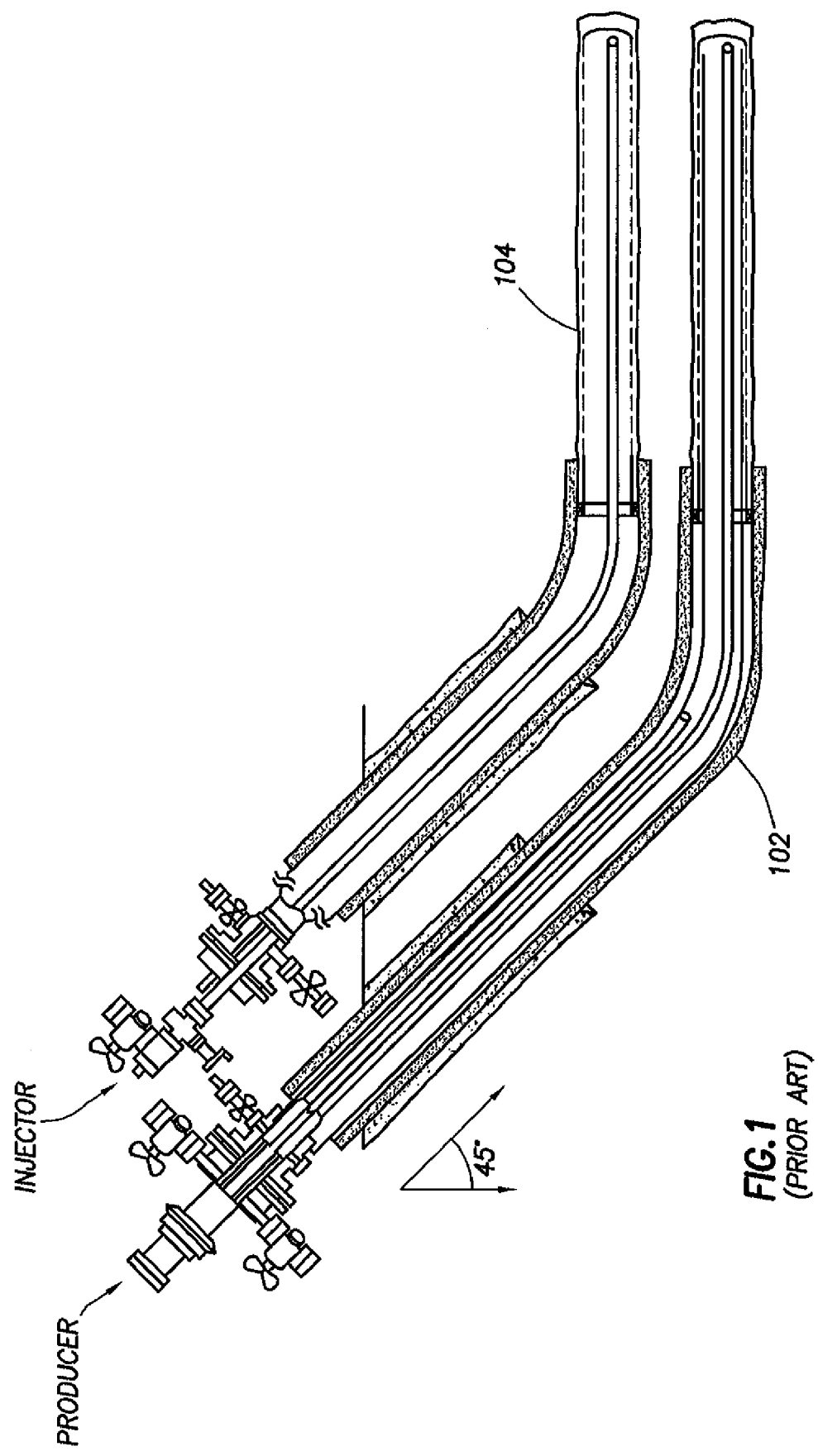
FIG. 1 shows a pair of parallel SAGD wells (prior art).
Figure 2:
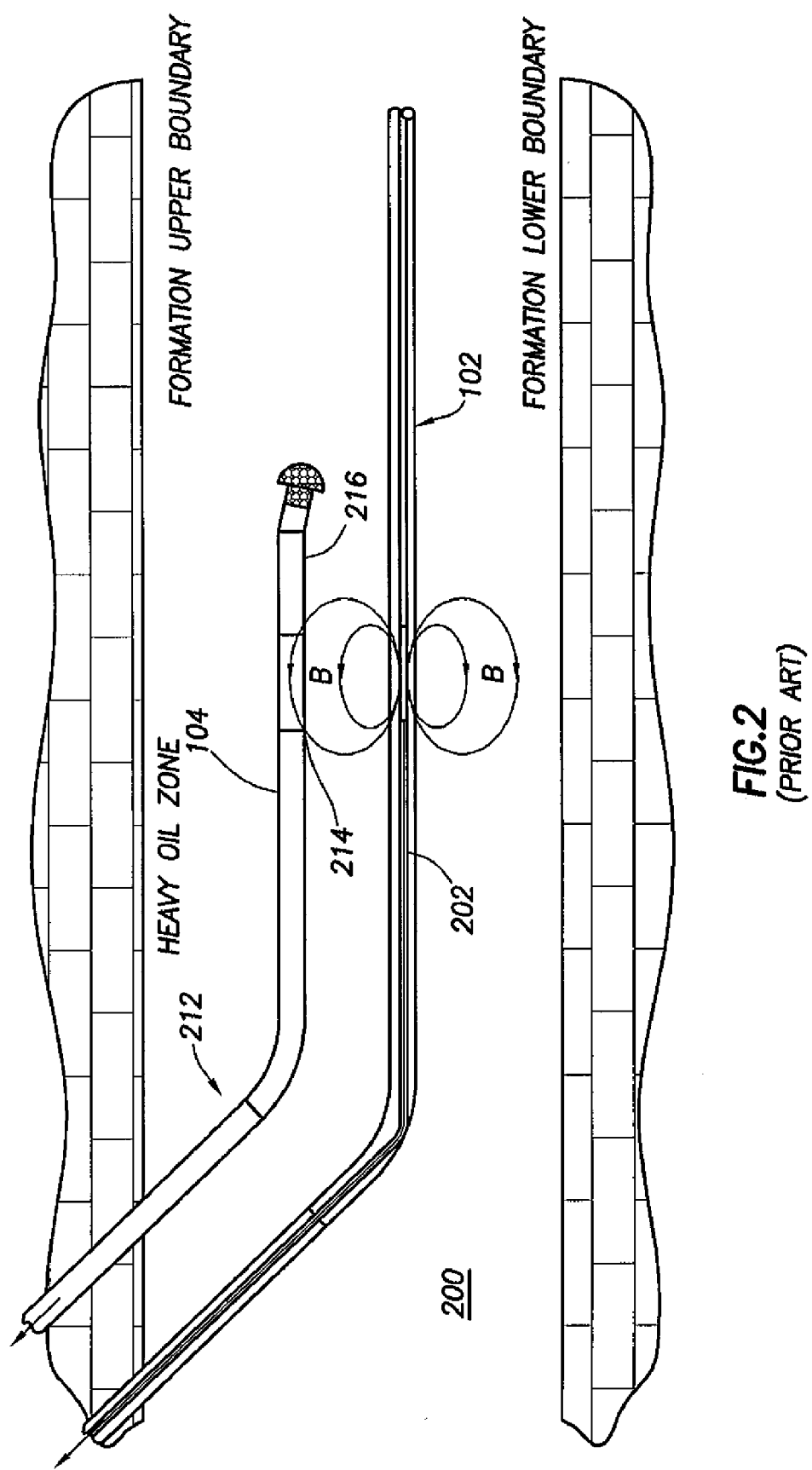
FIG. 2 shows a wireline tool deployed inside the tubing of well #1 (prior art).
Figure 3:
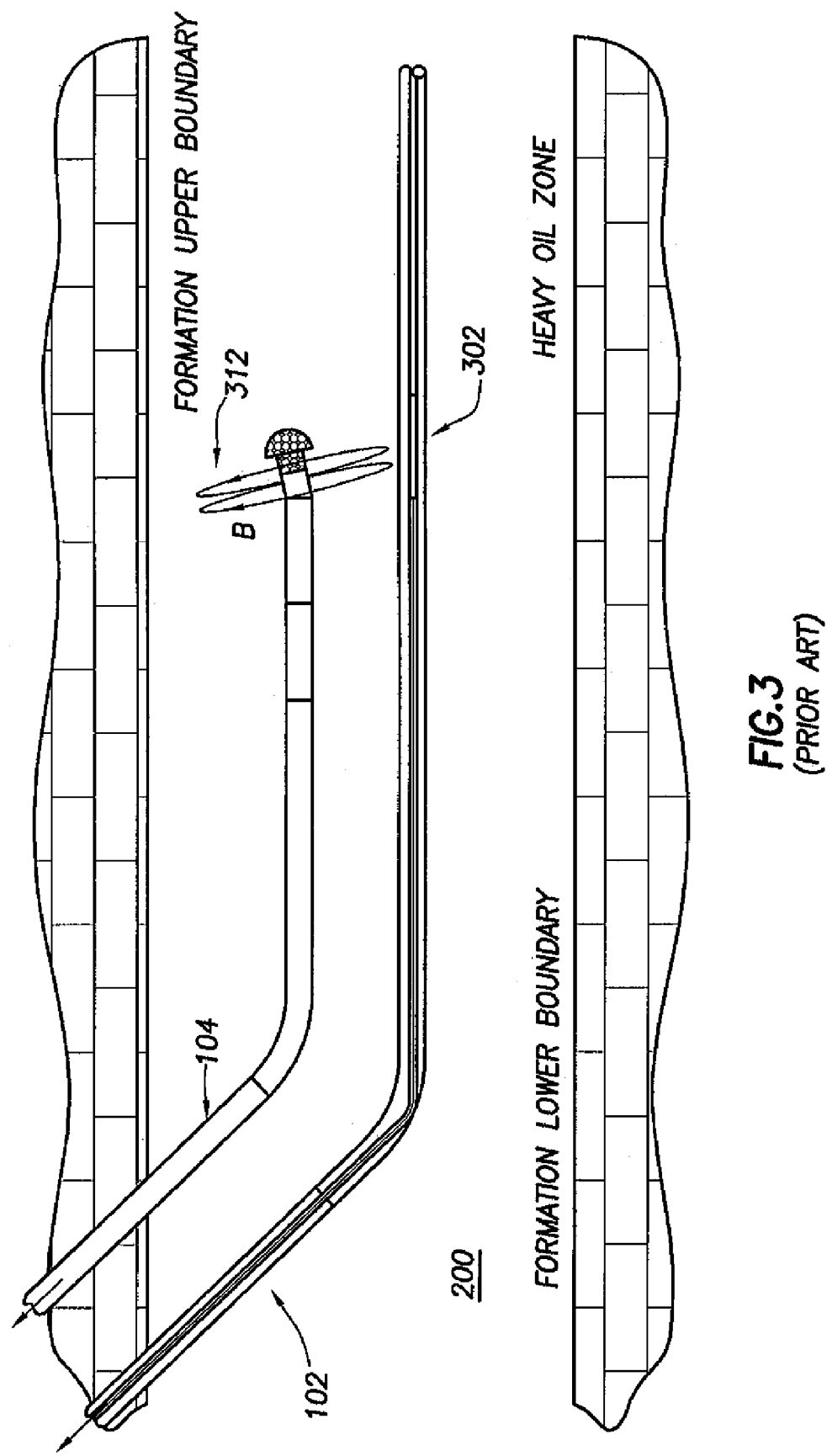
FIG. 3 shows a BHA having strong permanent magnets mounted in a near-bit sub in well #2 while the wireline tool in well #1 contains magnetometers (prior art).
Figure 4:
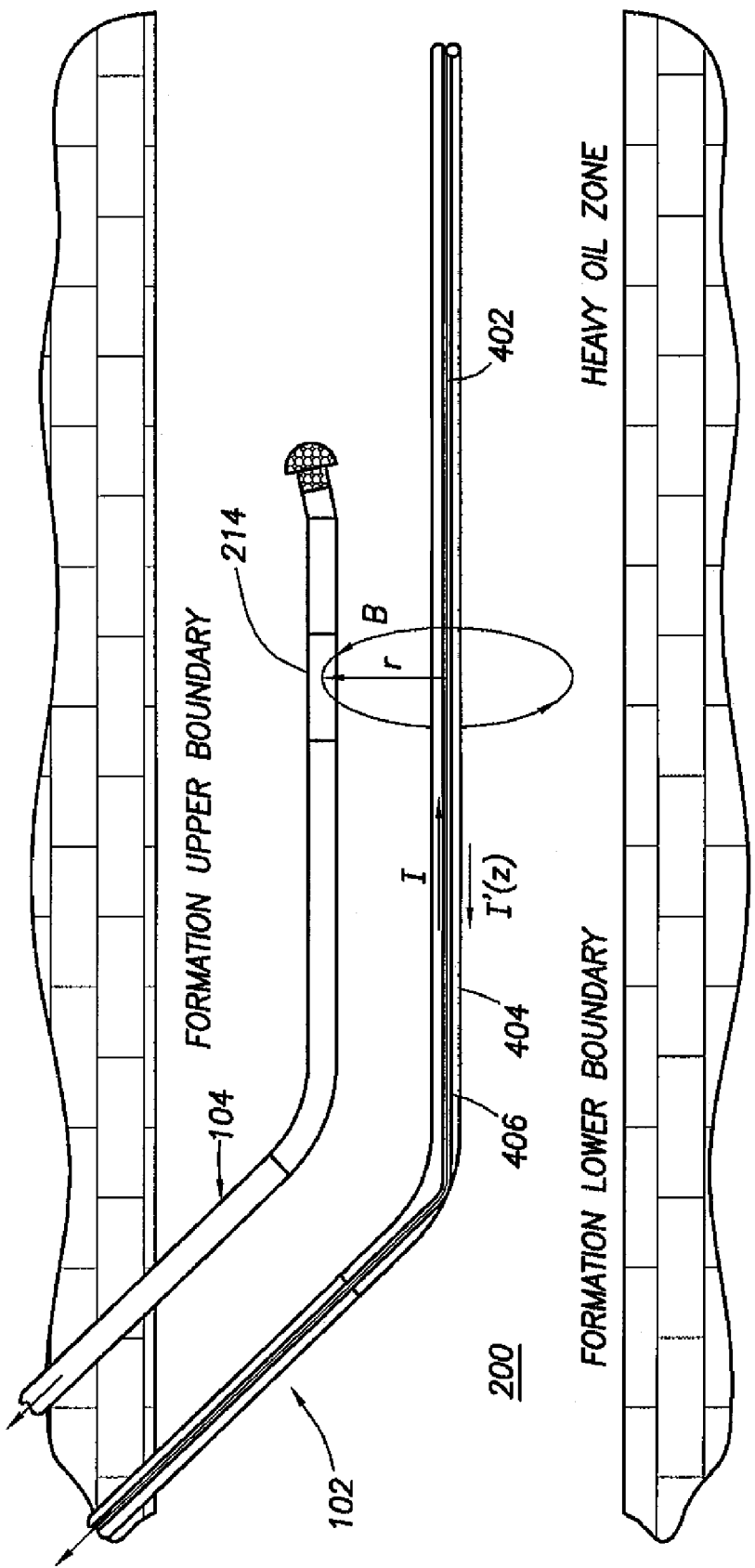
FIG. 4 shows a system in which current is run in well #1 (prior art).

The present disclosure pertains to a method for drilling two or more substantially parallel wells as shown in FIG. 1 (wells 102 and 104 respectively). The methods of the present disclosure can improve the efficiency of the drilling process by reducing the non-drilling time of the rigs, or by eliminating the requirement for additional equipment that are solely used for moving a wireline tool in the cased well.

One application is SAGD (Steam Assisted Gravity Drainage) wells employed to produce heavy oil such as is found in Canada. Western Canada has 2.6 trillion barrels of heavy oil in place. About 1 million barrels of oil are produced each day using SAGD. In the SAGD process, two horizontal wells are drilled parallel to each other with a typical separation of 5 meters. These wells typically have horizontal displacements of one or more kilometers. Maintaining the desired separation within 1 meter over such distance is very challenging and beyond the capabilities of standard MWD direction and inclination measurements.

A close tolerance in the spacing of the two wells is necessary for efficient oil production in SAGD applications. Steam is injected into the upper horizontal well and heats the heavy oil, rendering it less viscous. The hot oil then flows into the lower well and is pumped to the surface. Maintaining a precise distance between the two horizontal wells, keeping the two wells parallel relative to each other, and positioning the upper well over the lower well are all very important to obtain high productivity. Properly placed, two SAGD wells can recover up to 60% of the oil in place. Russia and Venezuela each have more than a trillion barrels of heavy oil, while the United States has over 200 billion barrels of heavy oil. SAGD wells may represent the most cost-effective means for producing these vast resources.

The present disclosure describes drilling and completing two or more wells nearly simultaneously, thus reducing the rig time by roughly half if a second rig is used to position the wireline tool in the cased well. If coiled tubing, pumps, or a tractor is currently used to position the wireline tool, they will no longer be required. The method provides for steering well #2 parallel to well #1, while simultaneously drilling the two wells. In addition, operating two rigs simultaneously can lead to operational efficiencies since personnel and supplies can be shared between the two rigs.

A critical problem solved by the present disclosure is how to position well #2 relative to the well #1 while both are being drilled. One solution is to employ magnetic ranging between the two bottom hole assemblies (BHAs) during drilling. One BHA may contain the source of the magnetic field, while the other BHA contains magnetometers to detect the magnetic field. Well #1 is drilled with respect to the formation geology and leads well #2 by a short distance (typically 10-100 m). For example, distances of approximately 10 m, 20 m, or 30 m would be advantageous since these correspond to one, two, or three stands of drill pipe. Well #2 is drilled parallel to the first well using magnetic ranging.

Although herein the term "first" well and "second" well typically refer to the lower, producing, first completed well and the higher, non-producing, second completed well respectively, the present disclosure may also use the terms Well A and Well B interchangeably for reference only, for distinguishing between the well where the magnetic field is generated and well where the magnetic field is measured.

Figure 5:
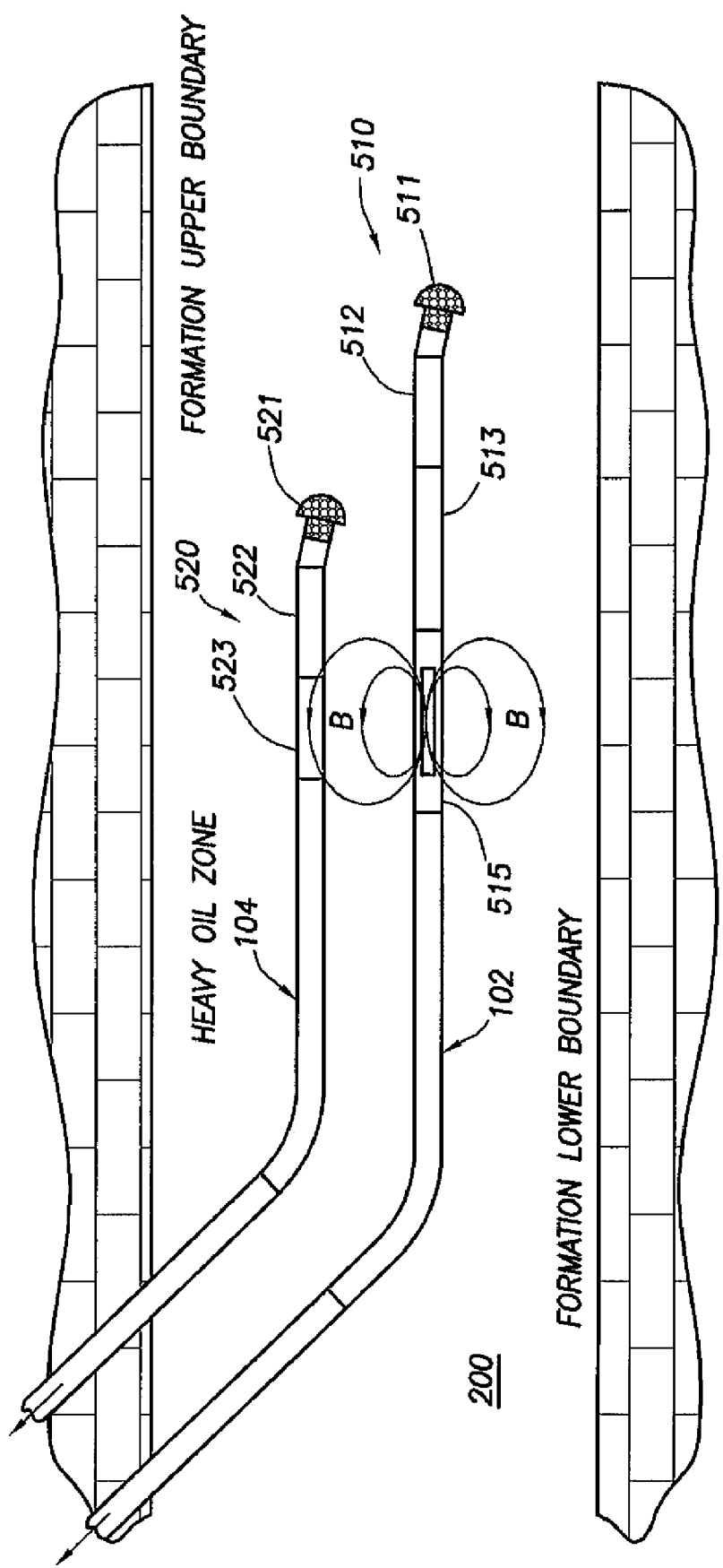
FIG. 5 shows a first embodiment of a magnetic ranging tool constructed in accordance with the present disclosure.

One embodiment is shown in FIG. 5. Well #1 102 has a BHA 510 consisting of a drill bit 511, a steerable motor or a rotary steerable system 512, an MWD tool 513 for telemetry and direction and inclination measurements, possibly a logging-while-drilling (LWD) tool (not shown) for measuring formation properties, and a solenoid 515 located in a drill collar. The solenoid 515 can be powered by batteries or by a mud-driven turbine. The solenoid 515 can be mounted in a mandrel section inside the drill collar as shown in FIG. 6, or can be wrapped around the outside of the drill collar. Referring to FIG. 6, the drill collar 601 is preferably non-magnetic to allow the magnetic fields generated by the solenoid 515 to more easily penetrate the drill collar wall 601. The solenoid 515 consists of a highly permeable magnetic core, such as mu-metal, with coils wrapped around the core. The solenoid 515 may be contained inside a non-magnetic pressure housing 603. An annular channel 605 between the pressure housing 603 and the drill collar 601 provides a mud channel. Power and control electronics 607 are also contained inside the pressure housing 603. A mud turbine 609 can provide up to several kilowatts of power to drive the solenoid. A telemetry link to the MWD tool 513 in the BHA 510 provides the means of passing data and commands between the solenoid and the MWD tool 513, which may also receive commands from the surface via a downlink.

In embodiments having the solenoid 515 wrapped around the outside of the drill collar 601, it is preferable for the solenoid to be recessed slightly for mechanical protection. Also, the drill collar material could be magnetic to enhance the magnetic field.

Referring again to FIG. 5, BHA #2 520 (deployed in well #2 104) contains a drill bit 521, a steerable motor or a rotary steerable system 522, an MWD tool 523 for telemetry and direction and inclination measurements, and possibly an LWD tool (not shown) to measure formation properties. In the embodiment of FIG. 5, BHA #2 520 preferably includes a three-axis magnetometer, which may be located in the MWD tool 523 or in a different sub.

The process for drilling these two wells 102, 104 is now explained in detail. First, well #1 102 is drilled according to the subsurface geology, and to a direction and an inclination and leads well #2 104. (Well #1 102 could alternatively be the injecting well; order is not relevant to the discussion of the present disclosure.) Data from BHA #1 510 are transmitted to the surface, interpreted, and the driller adjusts the trajectory of well #1 102 as needed by sending commands to the rotary steerable system 522 or by orienting the steerable motor. Well #2 104 is drilled simultaneously with well #1 102, with its magnetometers in the proximity of the solenoid 515 in BHA #1 102. When the distance between the solenoid 515 and MWD tool #1 513 is sufficiently large, the magnetic field generated by the solenoid 515 will not affect the magnetometers in the MWD tool 513. If there is a close spacing between the two, the solenoid 515 should be off when taking magnetometer readings of the Earth's magnetic field. Alternatively, the MWD tool 513 could employ a gyroscope for acquiring azimuthal direction.

An example operational and data acquisition will be described with reference to FIGS. 5 and 10. The following description includes steps that may be optional, unnecessary, or that may be performed by multiple parties. It is typical to have multiple companies performing different services on the same rig. Thus, the methods are intended to be limited only by the attached claims.

The method may include stopping the drilling process and halting the rotation of each BHA 510, 520 (step 1002). The process may be stopped when it becomes important for the wells 102, 104 to be drilled in an accurate position. The method may also be iterative, and step 1002 may represent the start of an iteration.

The method may include measuring the direction and inclination for each BHA 510, 520 (step 1004). In some embodiments, such measurements may be performed with standard direction and inclination ("D&I") instruments that are located in each BHA 510, 520. For example, the direction may be measured with magnetometers that reference the Earth's magnetic field, and the inclination may be measured with accelerometers that reference the direction of gravity. While it is convenient and useful to measure the direction and inclination for both BHAs, the method can also be applied by measuring the direction and inclination of only one BHA, preferably that of the first BHA 510. As the relative position of the second BHA 520 will be inferred from the magnetic field measurements, it is not essential to measure the direction and inclination of the second BHA 520.

The method may include turning the mud pumps on in well #1 102 and activating the solenoid 515 in BHA #1 510 (step 1006). The mud pumps may be optionally engaged for the purposes of mud pulse communications, and in some examples, where other forms of telemetry are employed (e.g., wired drill pipe, electromagnetic pulses), the mud pumps may be left off.

The method may include measuring the magnetic field from the solenoid 515 with magnetometers in well #2 104, while measuring the current in the solenoid 515 (step 1008). In some embodiments, the current in the solenoid 515 is reversed to eliminate the Earth's magnetic field from the data. Measuring the current and the magnetic field are shown here as one step for convenience; alternatively the measurements may be performed separately.

Figure 10:
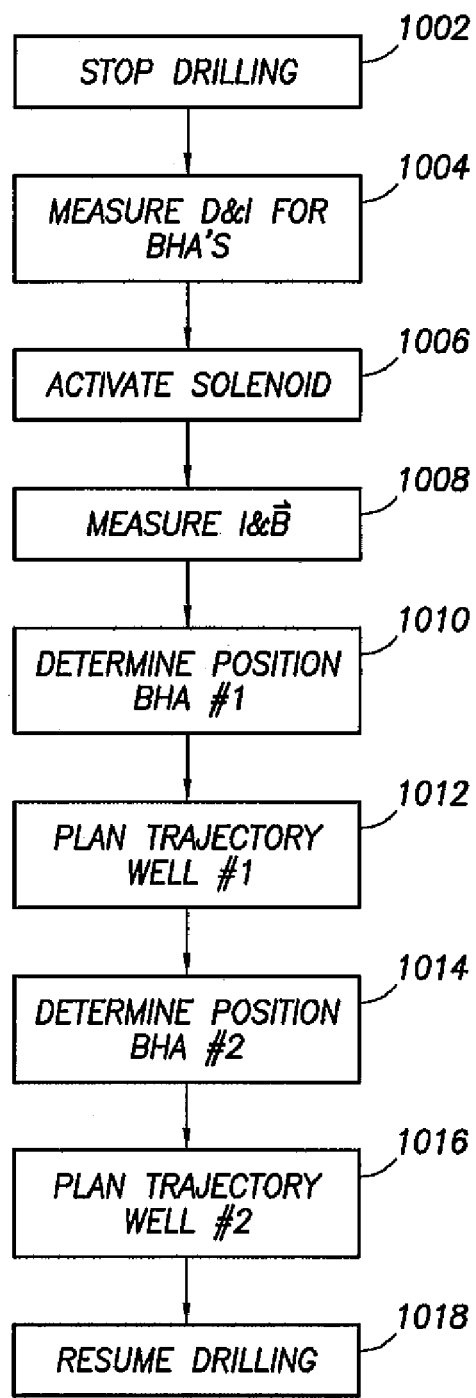
FIG. 10 shows a flow chart for a first method.

The method may include transmitting measurements from each BHA 510, 520 to the surface (not shown in FIG. 10). Sliding a BHA along the wellbore would result in measurements at several measured depths.

The method may include analyzing the data from BHA #1 510 to determine the position of BHA #1 510 with respect to the geology (step 1010). In some embodiments, this includes formation evaluation data collected by other LWD tools in the BHA #1 510.

The method may include planning the direction and inclination for drilling the next section of well #1 102 (step 1012). In some embodiments, the plan for the first BHA #1 510 is based on the need or desire to maintain the well 102 in a certain position with respect to formation boundaries or other geologic features.

The method may include analyzing the data from BHA #2 520 to determine its position and direction relative to BHA #1 510 (step 1014). The same analysis is employed as when the solenoid 515 is inside the cased well, as would be known by one of ordinary skill in the art.

The method may include planning the direction and inclination for drilling the next section of well #2 104 to keep well #2 104 parallel to well #1 102 (step 1016). This is performed based on the planned trajectory of well #1 102 and the position of well #2 104 with respect to well #1 102. This step may also account for errors in the positioning of well #2 104. Thus, planning the direction and inclination of well #2 may compensate for well #2 being out of position, as well as for the planned trajectory of well #1 102.

The method may include resuming drilling in both wells 102, 104 (step 1018).

Figure 7:
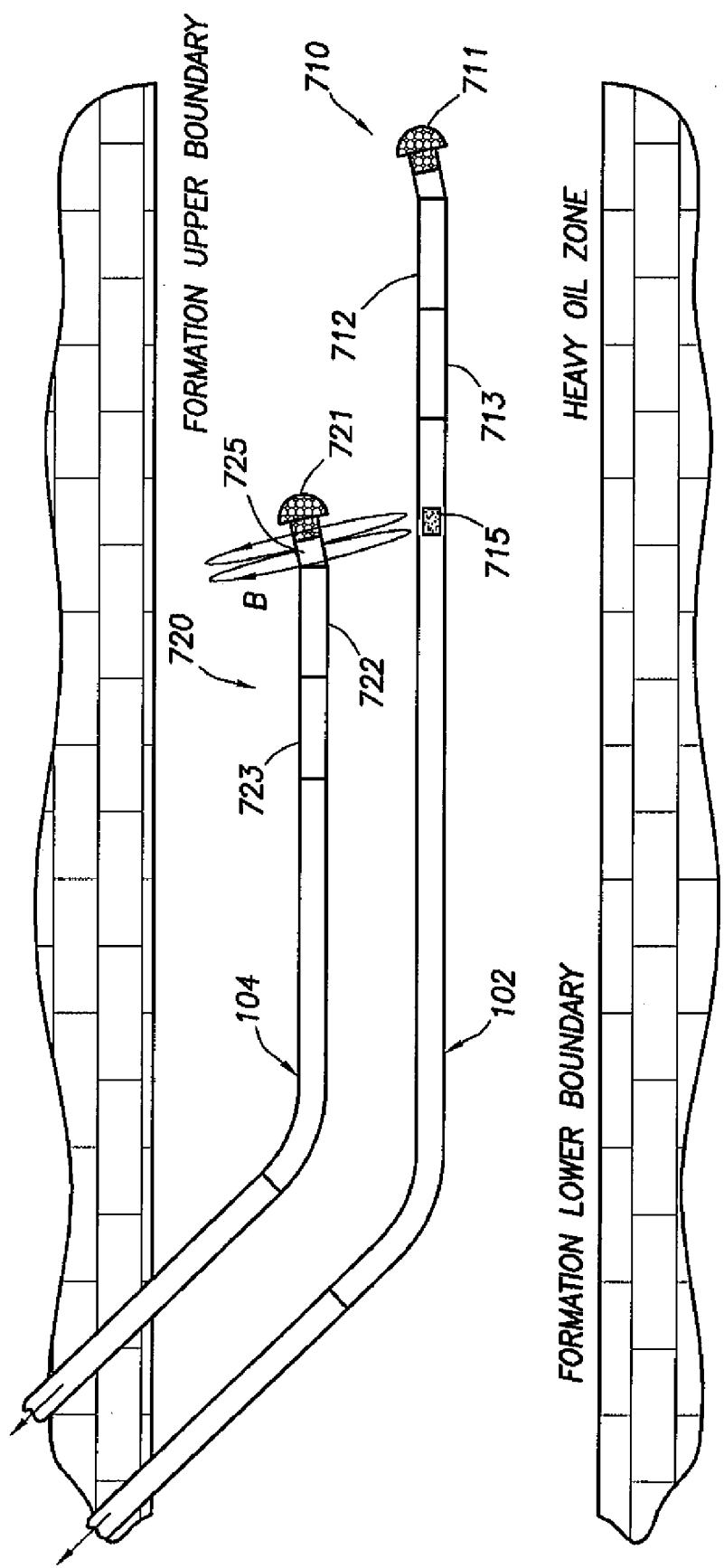
FIG. 7 shows a second embodiment of a magnetic ranging tool constructed in accordance with the present disclosure.

A second example is illustrated in FIG. 7. BHA #1 710 consists of a drill bit 711, a steerable motor or a rotary steerable system 712, an MWD tool 713 for telemetry and direction and inclination measurements, possibly an LWD tool (not shown) for measuring formation properties, and at least one single-axis magnetometer 715 aligned with the BHA axis. In some embodiments, a three-axis magnetometer may also be useful.

BHA #2 720 contains a drill bit 721, a sub with permanent magnets 725, a steerable motor or a rotary steerable system 722, and an MWD tool 723 for telemetry and direction and inclination measurements. The permanent magnets 725 can be mounted in a near-bit sub. BHA #1 710 leads BHA #2 720 such that the permanent magnets 725 in BHA #2 720 are proximate to the single-axis magnetometers in BHA #1 710, or slightly ahead of this point.

Figure 11:
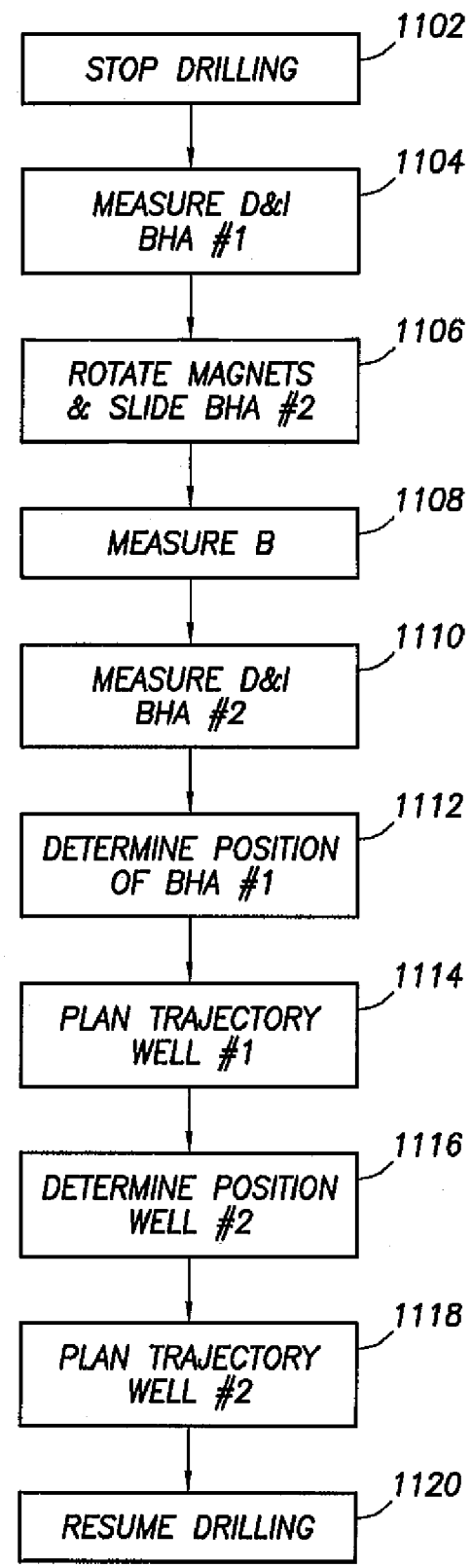
FIG. 11 shows a flow chart for a second method.

An illustrative sequence of operation and data acquisition is shown in FIGS. 7 and 11. The following description includes steps that may be optional, unnecessary, or that may be performed by multiple parties. It is typical to have multiple companies performing different services on the same rig. Thus, the methods are intended to be limited only by the attached claims.

The method may include stopping the drilling process and halting the rotation of each BHA 710, 720 (step 1102). The drilling/rotating process may be stopped when it becomes important for the wells 102, 104 to be drilled in an accurate position. The method may also be iterative, and step 1102 may represent the start of an iteration.

The method may include measuring the direction and inclination for BHA #1 710 (step 1104). In some embodiments, such measurement may be performed with standard D&I instruments located in the BHA 710.

The method may include rotating the permanent magnets in BHA #2 720 while sliding BHA #2 720 (step 1106) and measuring the magnetic field in BHA #1 710 versus the measured depth of BHA #2 720 (step 1108). BHA #2 720 preferably slides slightly further than the inter-well separation, ahead and behind the magnetometers in BHA #1 710. The variation of magnetic field with measured depth determines the inter-well spacing.

The method may include measuring the direction and inclination in BHA #2 720 while BHA #2 720 is sliding (step 1110). In another example, the direction and inclination of BHA #2 720 may be measured while the BHA #2 720 is stationary, although doing so may add time to the process.

The method may include transmitting measurements from each BHA 710, 720 to the surface (not shown in FIG. 11).

The method may include analyzing the data from BHA #1 710 to determine the position of BHA #1 710 with respect to the geology (step 1112). In some embodiments, determination is based on data from LWD tools that are included in the BHA 710.

The method may include planning the direction and inclination for drilling the next section of wellbore 102 (step 1114). In some embodiments, the plan for the BHA #1 710 is based on the need or desire to maintain the well 102 in a certain position with respect to formation boundaries or other geologic features.

The method may include analyzing the data from BHA #2 720 to determine its position and direction relative to BHA #1 710 (step 1116). The same analysis is used as when the magnetometer is inside the cased well, as would be known by one of ordinary skill in the art.

The method may include planning the direction and inclination for drilling the next section of well #2 104 to keep it parallel to well #1 102 (step 1118). This is performed based on the planned trajectory of well #1 102 and the position of well #2 104 with respect to well #1 102. This step may also account for errors in the positioning of well #2 104. Thus, planning the direction and inclination of well #2 may compensate for well #2 being out of position, as well as for the planned trajectory of well #1 102.

The method may include resuming drilling in both wells 102, 104 (step 1120).

Alternatively, the method may involve holding BHA #2 720 stationary, and sliding BHA #1 710 backwards while measuring the magnetic field produced by the rotating magnets 725 with magnetometer 715. BHA #2 is moved a distance approximately twice the separation between well #1 102 and well #2. The other steps in the method are similar to those outlined above.

Figure 8:
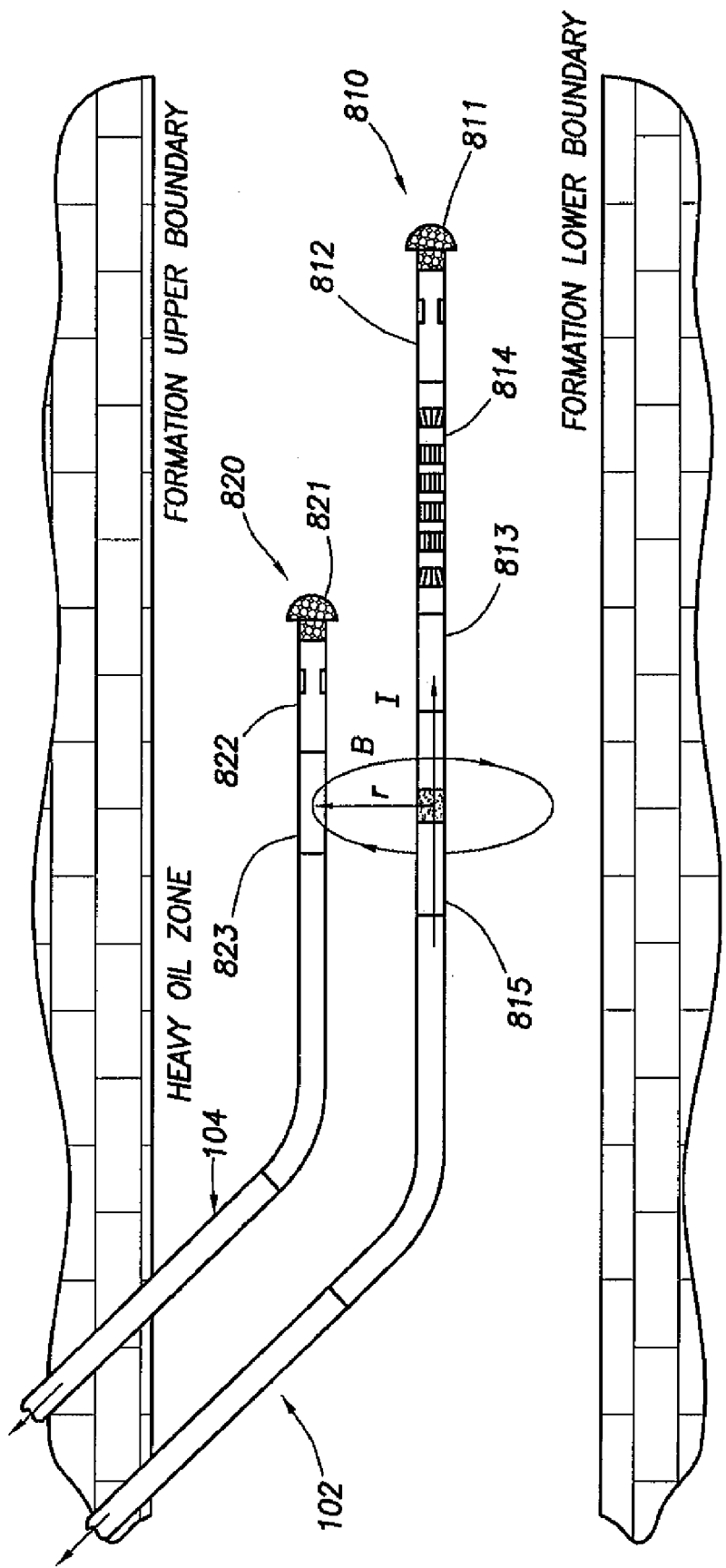
FIG. 8 shows a third embodiment of a magnetic ranging tool constructed in accordance with the present disclosure.

A third example is shown in FIG. 8. BHA #1 810 consists of a drill bit 811, a steerable motor or a rotary steerable system 812, an MWD tool 813 for telemetry and direction and inclination measurements, possibly an LWD tool 814 for measuring formation properties, and a drill collar with an insulated gap 815 and the ability to drive an electric current across the gap. An electromagnetic telemetry MWD tool such as E-Pulse™ can provide telemetry, direction and inclination measurements (see U.S. Pat. No. 7,080,699), and can also provide an insulated gap 815 for the purposes of generating a magnetic field used for magnetic ranging. A resistivity LWD tool 814 in BHA #1 810 is advantageous not only for geosteering, but also for the magnetic ranging technique described below. Periscope15™, for example, would help place well #1 102 with respect to formation layers, while measuring formation resistivity around well #1 102. BHA #2 820 contains a drill bit 821, a steerable motor or a rotary steerable system 822, a MWD tool 823 for telemetry and direction and inclination measurements, and at least one three-axis magnetometer, which may be located in the MWD tool 823.

As before, well #1 102 is drilled according to the subsurface geology and well #2 104 is drilled to maintain a specific direction and specific distance from well #1 102. BHA #2 820 lags slightly behind BHA #1 810 so that its three-axis magnetometer is in the vicinity of the insulated gap collar in BHA #1 810.

An electric current (I(0)) of known amplitude, frequency, and phase is produced across the insulated gap in BHA #1. The E-Pulse™ MWD tool, for example, can produce 17 amps current over a frequency range from less than 1 Hz to about 50 Hz. The E-Pulse™ MW tool can also measure the insulated gap current and gap voltage, thus determining the average formation resistivity over the length of the BHA.

Figure 9:
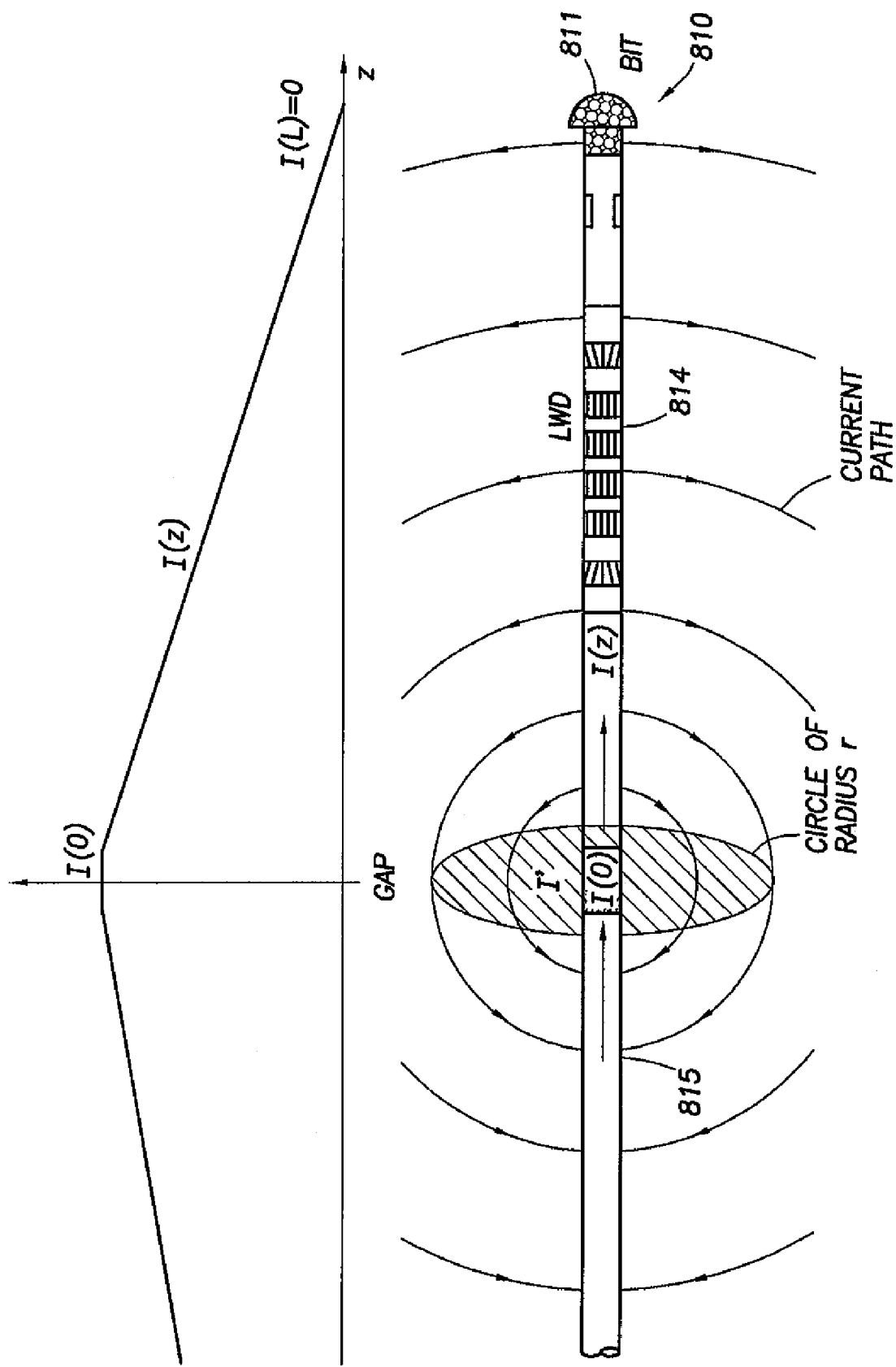
FIG. 9 shows the current pattern for a BHA of the magnetic ranging tool of FIG. 8 when the well is drilled with conductive water based mud.

When the wells 102, 104 are drilled with conductive water based mud (WBM), the current flows along the BHA 810 to the drill bit and also flows radially off of the drill collars into the formation (FIG. 9). The axial current I(z) decreases approximately linearly with distance from the insulated gap 815, and is nearly zero at the drill bit face 811. For example, the current on BHA #1 810 halfway between the insulated gap 815 and the drill bit 811 will be ≈I(0)/2, where I(0) is the current at the insulated gap 815. The current on BHA #1 810 also decreases with distance above the insulated gap 815, but usually at a slower rate.

When the well is drilled with non-conductive oil based mud (OBM), the current below the insulated gap 815 remains roughly constant. Most of the current leaves the lower BHA 810 through the face of the drill bit 811 because the intimate mechanical contact of the bit with the formation that is required for drilling also provides electrical contact. There is minimal electric contact between the BHA 810 and the formation between the insulated gap 815 and the drill bit 811.

Drilling with either WBM or OBM, a significant current is flowing along BHA #1 810. The variation of this current with distance from the insulated gap 815 can be easily estimated when the formation resistivity and the mud resistivity are known. In any circumstance, the current at the insulated gap can be accurately measured, and this information transmitted to the surface.

As with the Single Wire Guidance™ System, the current I(z) produces an azimuthal magnetic field centered on the BHA #1 810. In WBM, the magnetic field in the transverse plane of the insulated gap 815 (i.e. at z=0) is given by $$\vec{B}(0) = \frac{\mu_0 [I(0) - I']}{2\pi r} \hat{n} \times \hat{r},$$

where $\vec{r}$ is the radial vector from the axis of BHA #1 810 to the point of observation, r=| $\vec{r}$ | is the magnitude of $\vec{r}$, $\hat{r}$= $\vec{r}$/r is a unit vector that points from the axis of BHA #1 810 to the point of observation, $\hat{n}$ is a unit vector that points along the axis of BHA #1 810. Referring to FIG. 9, a current (I') returns through the formation inside a circle of radius r, so the net current inside the circle is [I(0)-I']. A rough approximation is that the current flows in a spherical path in the formation. Hence, the current at radius r entered the formation at z=r and returned to BHA at z=-r. If r is small compared to L (the length of BHA #1 below the gap), then I'/I(0)·r/L. For example, with L=60 m and r=5 m, then I'~0.08I(0), so I' is a small correction. A more exact result can be obtained from known BHA geometry and measured formation and mud resistivities by using a finite element modeling code.

When the three-axis magnetometer in BHA #2 820 is located near the transverse plane containing the insulated gap, the magnetic field $\vec{B}$(0) measured in BHA #2 820 is related to the separation of the two wells r, to the relative direction from BHA #1 to BHA #2 $\hat{r}$, and to the relative orientation between the two wells, i.e. the angle between $\hat{n}$ and $\hat{z}$, where $\hat{z}$ points along the axis of BHA #2. Since I(0) is measured in BHA #1 810, I' can be estimated, and the three components of the magnetic field are measured, the relative geometric relationship between BHA #1 810 and BHA #2 820 can be deduced following the same general procedure as described in detail in U.S. patent application Ser. No. 11/550,839. A specific example illustrating how to determine the separation between the two BHAs, the relative direction from BHA #1 810 to BHA #2 820, and the relative orientation between the two BHAs is provided later.

Figure 12:
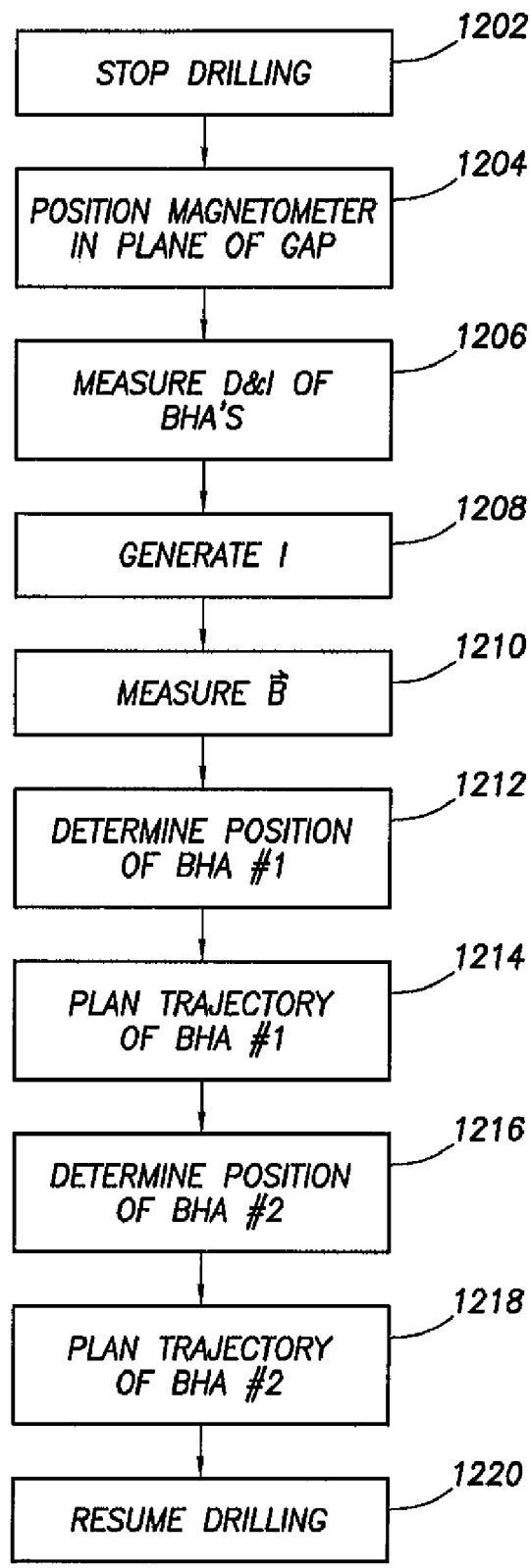
FIG. 12 shows a flow chart for a third method.

An example sequence of operation and data acquisition is shown in FIGS. 8, 9, and 12. The following description includes steps that may be optional, unnecessary, or that may be performed by multiple parties. It is typical to have multiple companies performing different services on the same rig. Thus, the methods are intended to be limited only by the attached claims.

The method may include stopping the drilling process and halting the rotation of each BHA 810, 820 (step 1202). The process may be stopped when it becomes important for the wells 102, 104 to be drilled in an accurate position. The method may also be iterative, and step 1202 may represent the start of another iteration.

The method may include positioning the three-axis magnetometer in BHA #2 820 in the plane of the insulated gap 815 (step 1204). In some embodiments, such positioning specifically includes sliding BHA #2 820 until the three-axis magnetometer is aligned.

The method may include measuring the direction and inclination for both BHAs 810, 820 (step 1206). In some embodiments, such measurements may be performed with standard D&I instruments located in the BHAs 810, 820. While it is convenient and useful to measure the direction and inclination for both BHAs, the method can also be applied by measuring the direction and inclination of only one BHA, preferably that of the first BHA 810. As the relative position of the second BHA 820 will be inferred from the magnetic field measurements, it is not essential to measure the direction and inclination of the second BHA 820.

The method may include generating a current I(0) on the insulated gap 815 of the first BHA 810 and measuring the amplitude of the current I(0) (step 1208). For convenience, generating the current and measuring the current are shown here as one step; alternatively such measurements may be performed separately.

The method may include measuring the resulting magnetic field with the magnetometers in BHA #2 820 (step 1210).

The method may include analyzing the data from BHA #1 810 to determine the position of BHA #1 810 with respect to the geology (step 1212). In some embodiments, this determination is based on data from LWD tools that are included in the BHA 810.

The method may include planning the direction and inclination for drilling the next section of wellbore 102 (step 1214). In some embodiments, the plan for the first BHA 810 is based on the need or desire to maintain the well #1 102 in a certain position with respect to formation boundaries or other geologic features.

The method may analyzing the data from BHA #2 820 to determine the position and direction of BHA #2 820 relative to BHA #1 810 (step 1216). This analysis may include using the measurements of the magnetic field generated by the current flowing on the BHA #1 810. For example, the magnetic field data from BHA #2 820 may be analyzed to determine the position and direction of BHA #2 820 relative to BHA #1 810. Step 1216 may include the correction for the return current I'. The same analysis is used as when the magnetometer is inside the cased well, as would be known by one of ordinary skill in the art.

The method may include planning the direction and inclination for drilling the next section of well #2 104 to keep well #2 104 parallel to well #1 102 (step 1218). The plan may be based on the planned trajectory of well #1 102 and the position of well #2 104 with respect to well #1 102. Step 1218 may also account for errors in the positioning of well #2 104. Thus, planning the direction and inclination of well #2 may compensate for well #2 being out of position, as well as for the planned trajectory of well #1 102.

The method may include resuming drilling in both wells 102, 104 (step 1220).

There are many possible variations in operations and applications. For example, the insulated gap could be located on BHA #2, and the magnetometers placed in BHA #1. It is not necessary that the magnetometer in BHA #2 820 be in the transverse plane centered on the insulated gap 815. The current I(z) on BHA #1 decreases with distance z in a predictable manner in water-based mud (WBM), so that the magnetic field B(z) can be calculated from $$\vec{B}(z) = \frac{\mu_0[I(z) - I']}{2\pi r} \hat{n} \times \hat{r},$$

where the magnetometer in BHA #2 820 is located a distance z from the transverse plane of the insulated gap 815. If the well is drilled with insulating oil-based mud (OBM), then the magnetic field can be calculated from $$\vec{B}(z) = \frac{\mu_0 I(0)}{2\pi r} \hat{n} \times \hat{r}$$

since the current on BHA #1 810 is constant between the insulated gap 815 and the bit 811.

Alternatively, both BHAs could have insulated gaps and magnetometers, so that each BHA can generate a magnetic field that is read by the other BHA. Also, it is not mandatory that one BHA actually leads the other BHA. Both drill bits could be at the same measured depth, while the relative locations and orientations of the wells are determined by magnetic ranging.

One or both wells could be drilled using coiled tubing, rather than drilling rigs. They could also be casing drilled, where casing replaces drill pipe. Measuring the magnetic field while both wells are being drilled, and by removing the effects of rotation from the data, provides continuous steering data for BHA #2. BHA# 1 can use continuous direction and inclination methods.

Portions of the methods described in FIGS. 10, 11, and 12 can be automated to reduce the human effort. Computers can receive and process data from downhole, perform computations involving the distance and relative positions of the two BHAs, and perform most of the steps outlined in FIGS. 10, 11, and 12. The human operator would ensure that the trajectory of BHA #1 is correct (step 1012 in FIG. 10, step 1114 in FIG. 11, and step 1214) such that BHA #1 is properly positioned in the formation. However, automation can be used to servo the position of BHA #2 to the position of BHA #1. In particular, steps involving determining the position of BHA #2 and planning the trajectory of BHA #2 (steps 1014 and 1016 in FIG. 10, steps 1116 and 1118 in FIG. 11, and steps 1216 and 1218 in FIG. 12) well can be done automatically by the computer. The human operator "drills" the first well 102, and the computer "drills" the second well. That is, the computer automatically adjusts the trajectory of the second well 104 to be a predetermined distance from the first well 102 and in a predetermined position relative to the first well 102. In this manner, both wells can be drilled simultaneously.

The solenoid employed in the first embodiment described herein could be a permanent magnet. In such an embodiment, the Earth's magnetic field could be subtracted from the measurements using data from the MWD tool in BHA #1. The rotating magnets in the second embodiment described herein could be short solenoids mounted transverse to the BHA axis, and could be energized by electric currents. In such an embodiment, the drill collar does not have to rotate, the currents in the two solenoids can be 90° out-of-phase and driven at a low frequency.

Another potential application of the magnetic ranging techniques described herein is producing shale oil using a large number of parallel vertical wells that maintain a precise spacing. Such parallel vertical wells could be drilled in pairs, or even several could be drilled at one time where magnetic ranging is employed between adjacent BHAs.

Another potential application is drilling U-shaped wells. In such a case, the desired result an intersection of two wells that are drilled from opposite directions using two rigs. In a region of slight overlap, magnetic ranging from one BHA to the other can be employed to home-in and drill the two wells so as to intersect.

Magnetic ranging between two drilling BHAs can also be employed for non-parallel wells to locate their relative position (such as closest approach). The mathematical model employed to derive the relevant algorithms can have various levels of sophistication. For example, the field from BRA #1 can be modeled as a linear electric dipole in a conductive medium. Alternatively, the model can be a numerical model that explicitly includes both BHAs, includes variations in formation resistivity, borehole resistivity, etc. The second well can be drilled automatically using a feedback signal derived from the magnetic field produced by the BHA in the first well.

An example of how to determine the geometric relationship between BHA #1 810 and BHA #2 820 is now presented for Steam Assisted Gravity Drainage (SAGD) wells (FIG. 1). Both wells are horizontal and typically are 0.5-1.5 kilometers long. Normally, the lower SAGD well is the producing well 102, and the upper SAGD well 104 is the injector. The lower well 102 should be located near the bottom of a heavy oil zone, i.e. positioned relative to the geology, while the upper well 104 should maintain a fixed distance, typically 5 m from the lower well 102, and should be directly above it. Hence, they are also drilled relative to the Earth's geometry (i.e. horizontal and well 104 above well 102). The first well 102 contains BHA #1 810 which leads BHA #2 820 by 10 or more meters (see FIG. 8). BHA #1 810 contains an LWD tool, such as PeriScope15™, to position well 102 relative to the heavy oil zone, i.e. with respect to the geology.

Figure 13:
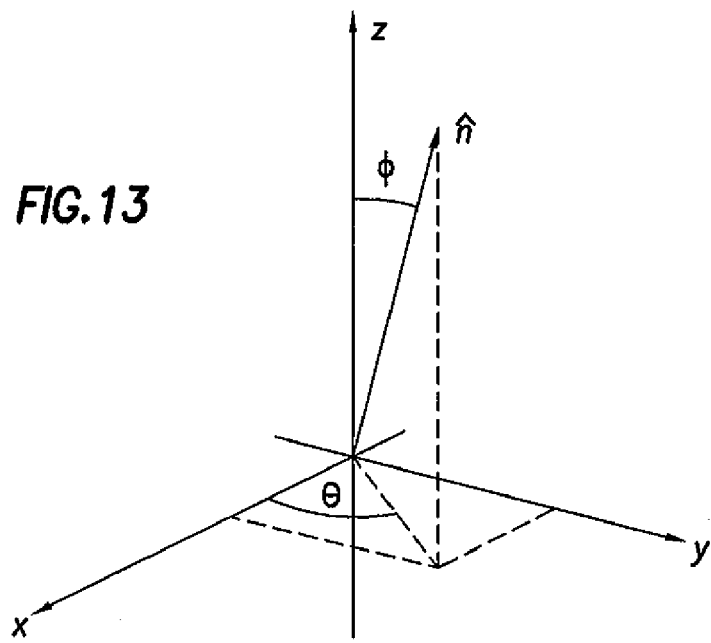
FIG. 13 shows the relative orientation of two wells.

FIG. 13 shows the relative directions of the two wells and the angles that relate to the relative orientation between the two wells. The (x, y, z) coordinate system is associated with the second well 104, where $\hat{z}$ is a unit vector aligned with the axis of BHA #2 820 and pointing toward the drill bit 821. The origin of the coordinate system, $\vec{0}=(0, 0, 0)$, is chosen to be at the magnetometer in the MWD tool 823. The unit vector $\hat{x}$ points downward (in the direction of gravity). The $\hat{x}$ direction can be determined from the accelerometers in the MWD tool 823 used in drilling the second well 104. The unit vector $\hat{n}$ is along the axis of BHA #1 810 and points toward the drill bit 811. The relative orientation between the two wells is the angle $\phi$, and the projection of $\hat{n}$ into the (x, y, 0) plane forms an angle $\theta$ with respect to the x-axis, where both angles are in radians. For SAGD wells, only small deviations from being parallel are acceptable for well 102 and well 104. Therefore the small angle approximation $\phi \ll 1$ will be assumed. The angle $\theta$ can range between 0 and $2\pi$ radians.

Figure 14:
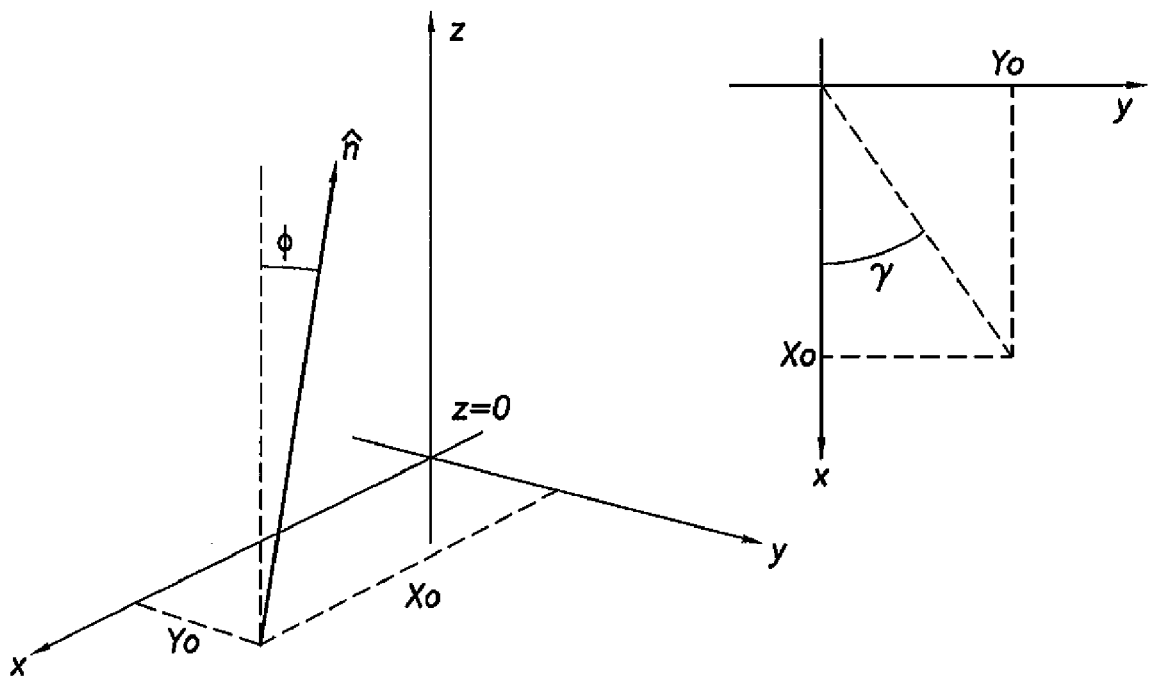
FIG. 14 shows the relative separation and relative position of two wells.

Let the insulated gap 815 in the BHA #1 810 in the first well be located in the plane of the magnetometer 823, i.e. at z=0. Also, BHA #1 810 should be directly below BHA #2 820. However, as illustrated in FIG. 14, the axis of BHA #1 810 may intersect the z=0 plane at the point $(x_0, y_0, 0)$. For SAGD wells, the offset from vertical $y_0$ should be much smaller than the inter-well separation $x_0$, or $y_0 \ll x_0$. The angle $\gamma$ defined by $y_0/x_0 \equiv \tan \gamma$ will therefore also be very small, i.e. $\gamma \ll 1$. In this example, the radial vector $\vec{r}$ points from the insulated gap 815 to the magnetometer located in the MWD tool 823, $\vec{r} = (-x_0, -y_0, 0)$. The separation between the two BHAs is $r = \sqrt{x_0^2 + y_0^2}$, and the direction from BHA #1 to BHA #2 is $\hat{r}$, which forms an angle $\gamma$ with respect to the x-axis.

The current I(0) across the insulated gap 815 produces a magnetic field at the magnetometer 823 given by $$\vec{B}(\vec{0}) = \frac{\mu_0 [I(0) - I']}{2\pi r} \hat{n} \times \hat{r}.$$

There are three components of the magnetic field, $\vec{B}(\vec{0}) = B_x(\vec{0})\hat{x} + B_y(\vec{0})\hat{y} + B_z(\vec{0})\hat{z}$ which can be measured by the three-axis magnetometer in MWD tool 823.

For simplicity, the Earth's magnetic field is neglected in the following analysis, and the BHAs are assumed to be stationary. These limitations can be removed. For example, an alternating current will produce an alternating magnetic field that can be differentiated from the Earth's static magnetic field. Also, if BHA #2 820 in the second well 104 is rotating at a known frequency, then one can transform the magnetometer data from the rotating tool frame to the stationary Earth frame.

The goal is to determine the following quantities for SAGD wells: the distance between the two wells r, the direction from BHA #1 to BHA #2 $\hat{r}$ which is related to the offset from vertical ($y_0 \approx \gamma r$), and the relative orientation of the two wells, $\theta$ and $\phi$. There are four measured or known quantities are: I(0), $B_x(\vec{0})$, $B_y(\vec{0})$, and $B_z(\vec{0})$, and four unknown quantities, however not all unknowns can be determined from magnetic field measurements made at a single depth.

Assuming small angles approximation, a three-axis magnetometer will measure three field components which are given by the approximate equations, $$B_x \approx \frac{\mu_0 I(0)}{2\pi r^2} y_0,$$

$$B_y \approx -\frac{\mu_0 I(0)}{2\pi r^2} x_0, \text{ and}$$

$$B_z \approx \frac{\mu_0 I(0)}{2\pi r^2} \{x_0 \sin\theta - y_0 \cos\theta\} \phi.$$

The $B_y$ component is the largest, i.e. $|B_y| \gg |B_x|$ and $|B_y| \gg |B_z|$. In the ideal situation, $y_0=0$ so that $B_x=0$, and $\phi=0$ so that $B_z=0$.

These equations can be solved to obtain the needed quantities. The relative separation of the two wells is obtained from $r=\sqrt{x_0^2+y_0^2}$ where $$x_0 = -\frac{\mu_0 I(0)}{2\pi[1+(B_x/B_y)^2]B_y} \text{ and}$$

$$y_0 = \frac{\mu_0 I(0) B_x}{2\pi[1+(B_x/B_y)^2]B_y^2},$$

since $I(0)$, $B_x$ and $B_y$ are measured. The relative direction from BHA #2 to BHA #1 is given by $\gamma$=arc $\tan(y_0/x_0)$. Thus, the separation and the relative position of the two wells have been determined from magnetic field measurements made at one depth.

The relative orientation of the two wells can be determined from measurements made at two depths. Let the first measurement be made with the magnetometer 823 at z=0 as before, which results in obtaining the relative location of the insulated gap 815 at the point $(x_0, y_0, 0)$ as described in the previous paragraphs. Now suppose both BHAs drill a further distance $\Delta z$ along their trajectories so that the insulated gap 815 and the magnetometer 823 are at a new depth. The magnetic field measurement is repeated at the new location, and a similar calculation provides new values for the x and y coordinates of the insulated gap 815 relative to the magnetometer 823, i.e. $(x_1, y_1, \Delta z)$. Since a line can be defined by the two points, $(x_0, y_0, 0)$ and $(x_1, y_1, \Delta z)$, the relative orientation of BHA #1 to BHA #2 is obtained. The equations for the angles are $$\tan\theta = \frac{y_1-y_0}{x_1-x_0}, \text{ and}$$

$$\tan\phi = \sqrt{\frac{(x_1-x_0)^2+(y_1-y_0)^2}{(z_1-z_0)^2}}.$$

Thus, all of the desired quantities describing the relative separation of BHA #1 and BHA #2, the direction from BHA #1 to BHA #2, and relative orientation of BHA #1 and BHA #2 are obtained.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed:

1. A method for drilling a first well and a second well, comprising:
    generating a magnetic field at a Bottom Hole Assembly (BHA) disposed in Well A by generating a current on an insulated gap in the BHA disposed in Well A;
    measuring the magnetic field at a BHA disposed in a Well B; and
    determining the geometric relationship between the BHA disposed in Well B and the BHA disposed in Well A based on the magnetic field measured at the BHA disposed in Well B.

2. The method according to claim 1, wherein determining the geometric relationship between the BHA disposed in Well A and the BHA disposed in Well B comprises at least one of:
    determining the separation between the BHA disposed in Well A and the BHA disposed in Well B;
    determining the direction from the BHA disposed in Well A to the BHA disposed in Well B; and
    determining the relative orientation of the BHA disposed in Well A to the BHA disposed in Well B.

3. The method according to claim 1, further comprising measuring a direction and an inclination for the BHA disposed in Well A.

4. The method according to claim 1, further comprising measuring a direction and an inclination for the BHA disposed in Well B.

5. The method according to claim 1, further comprising measuring a direction and an inclination for the BHA disposed in Well A and measuring a direction and an inclination for the BHA disposed in Well B.

6. The method according to claim 1, further comprising:
    determining the position of the BHA disposed in Well A relative to the at least one of the Earth's geology and the Earth's geometry.

7. The method according to claim 6, wherein the position of the BHA disposed in Well A is based on logging-while-drilling data.

8. The method according to claim 6, further comprising planning for direction and inclination for drilling a further section of Well A based on the determined position of the BHA disposed in Well B.

9. The method according to claim 6, further comprising planning for direction and inclination for drilling a further section of Well B based on the determined position of Well A and the plan for direction and inclination for Well A.

10. The method according to claim 1, further comprising:
    determining the position of the BHA disposed in Well B relative to the at least one of the Earth's geology and the Earth's geometry.

11. The method according to claim 10, wherein the position of the BHA disposed in Well B is based on logging-while-drilling data.

12. The method according to claim 10, further comprising planning for direction and inclination for drilling a further section of Well B based on the determined position of the BHA disposed in Well A.

13. The method according to claim 10, further comprising planning for direction and inclination for drilling a further section of Well A based on the determined position of Well B and the plan for direction and inclination for Well B.

14. The method according to claim 1, wherein Well A comprises a first, lower well, and Well B comprises a second, higher well.

15. The method according to claim 1, further comprising measuring an amplitude of the current on the insulated gap in the BHA disposed in Well A.

16. The method according to claim 1, further comprising measuring the magnetic field at the BHA disposed in Well B.

17. The method according to claim 16, wherein measuring the magnetic field at the BHA disposed in Well B comprises at least one of:
    measuring the amplitude of the magnetic field;
    measuring the direction of the magnetic field;
    measuring three orthogonal components of the magnetic field.

18. The method according to claim 17, wherein measuring three orthogonal components of the magnetic field comprises measuring $B_x$, $B_y$, and $B_z$.

19. The method according to claim 17, wherein the magnetic field is measured with a magnetometer in the BHA disposed in Well B.

20. The method according to claim 16, further comprising calculating the geometrical relationship between the BHA disposed in Well A and the BHA disposed in Well B.

21. The method according to claim 20, wherein the generated magnetic field at the BHA disposed in Well A is modeled by the following equation for conductive water based mud:

$$\vec{B}(0) = \frac{\mu_0 [I(0) - I']}{2\pi r} \hat{n} \times \hat{r}$$

wherein I(0) represents the current flowing across the insulated gap, I' is a correction term for current flowing in the Earth formation, r is the separation between the BHA disposed in Well A and the BHA disposed in Well B, $\hat{r}$ is a unit vector that points from the BHA disposed in Well A to the BHA disposed in Well B, $\hat{n}$ is a unit vector that points along the axis of the BHA disposed in Well A, and $\mu_0 = 4\pi \cdot 10^{-7}$ Henry/m is the permeability of free space.

22. The method according to claim 21, further comprising calculating at least one of:
the separation r between the BHA disposed in Well A and the BHA disposed in Well B; and
the direction $\hat{r}$ from the BHA disposed in Well A to the BHA disposed in Well B.

23. The method according to claim 21, further comprising measuring the magnetic field at a second location and calculating the relative orientation of the BHA disposed in Well A with respect to the BHA disposed in Well B.

24. The method according to claim 20, wherein the generated magnetic field at the BHA disposed in Well A is modeled by the following equation for water based mud:

$$\vec{B}(z) = \frac{\mu_0 [I(z) - I']}{2\pi r} \hat{n} \times \hat{r}$$

wherein I(z) represents the current flowing on the first BHA a distance z from the insulated gap, I' is a correction term for current flowing in the Earth formation, r is the separation between the BHA disposed in Well A and the BHA disposed in Well B, $\hat{r}$ is a unit vector that points from the BHA disposed in Well A to the BHA disposed in Well B, $\hat{n}$ is a unit vector that points along the axis of the BHA disposed in Well A, and $\mu_0 = 4\pi \cdot 10^{-7}$ Henry/m is the permeability of free space.

25. The method according to claim 24, further comprising calculating at least one of:
the separation r between the BHA disposed in Well A and the BHA disposed in Well B; and
the direction $\hat{r}$ from the BHA disposed in Well A to the BHA disposed in Well B.

26. The method according to claim 24, further comprising measuring the magnetic field at a second location and calculating the relative orientation of the BHA disposed in Well A with respect to the BHA disposed in Well B.

27. The method according to claim 20, wherein the generated magnetic field at the BHA disposed in Well A is modeled by the following equation for insulating oil based mud:

$$\vec{B}(z) = \frac{\mu_0 I(0)}{2\pi r} \hat{n} \times \hat{r}$$

wherein I(0) represents the current flowing across the insulated gap, r is the separation between the BHA disposed in Well A and the BHA disposed in Well B, $\hat{r}$ is a unit vector that points from the BHA disposed in Well A to the BHA disposed in Well B, $\hat{n}$ is a unit vector that points along the axis of the BHA disposed in Well A, and $\mu_0 = 4\pi \cdot 10^{-7}$ Henry/m is the permeability of free space.

28. The method according to claim 27, further comprising calculating at least one of:
the separation r between the BHA disposed in Well A and the BHA disposed in Well B; and
the direction $\hat{r}$ from the BHA disposed in Well A to the BHA disposed in Well B.

29. The method according to claim 27, further comprising measuring the magnetic field at a second location and calculating the relative orientation of the BHA disposed in Well A with respect to the BHA disposed in Well B.

30. The method according to claim 20, wherein the generated magnetic field at the BHA disposed in Well A is modeled by finite element code.

31. The method according to claim 1, wherein Well B comprises a first, lower well, and Well A comprises a second, higher well.

32. The method according to claim 1, wherein generating the magnetic field at the BHA in Well A comprises rotating one or more permanent magnets in the BHA disposed in Well A.

33. The method according to claim 1, further comprising halting drilling.

34. The method according to claim 1, further comprising halting rotation of the BHA disposed in Well A and the BHA disposed in Well B.

35. The method according to claim 33, further comprising resuming drilling.

36. The method according to claim 34, further comprising resuming rotation of the BHA disposed in Well A and the BHA disposed in Well B.

37. The method according to claim 1, further comprising transmitting measurements from the BHA disposed in Well A and the BHA disposed in Well B to the surface.

38. The method according to claim 1, further comprising automatically computing a position and a trajectory of the BHA disposed in Well B relative to a position and a trajectory of Well A.

39. The method according to claim 1, wherein drilling of Well A and Well B occurs substantially simultaneously.

40. A method for drilling two or more wells each having, respectively, a planned trajectory, comprising:
generating a magnetic field at the Bottom Hole Assembly (BHA) disposed in Well A by generating a current on an insulated gap in the BHA disposed in Well A;
measuring the magnetic field at a BHA disposed in a Well B;
determining the geometric relationship between the BHA disposed in Well B and the BHA disposed in Well A based on the magnetic field measured at the BHA disposed in Well B; and
adjusting the planned trajectory for Well A and adjusting the planned trajectory Well B to result in a desired placement for the two wells relative to one another.

41. The method according to claim 40, further comprising measuring a direction and an inclination for the BHA disposed in Well B.

42. The method according to claim 40, further comprising measuring a direction and an inclination for the BHA disposed in Well A.

43. The method according to claim 40, wherein determining the geometric relationship between the BHA disposed in Well B and the BHA disposed in Well A comprises determining the position of the BHA disposed in Well A relative to the Earth's geology; and determining the position of the BHA disposed in Well B relative to the position of the BHA disposed in Well A.

44. The method according to claim 40, wherein determining the geometric relationship between the BHA disposed in Well B and the BHA disposed in Well A comprises determining the position of the BHA disposed in Well A relative to the Earth's geometry; and determining the position of the BHA disposed in Well B relative to the position of the BHA disposed in Well A.

45. The method according to claim 40, wherein the desired placement for the two wells is parallel.

46. The method according to claim 40, wherein the desired placement for the two wells is intersection in a U-shape.

47. The method according to claim 40, wherein the desired placement for the two wells is sufficiently separate so as to avoid collision.

48. The method according to claim 40, wherein drilling of Well A and Well B occurs substantially simultaneously.

49. A method for drilling two or more parallel wells, comprising:
   measuring a direction and an inclination for a bottomhole assembly (BHA) disposed in a Well A;
   generating a magnetic field at the BHA disposed in Well A by generating a current on an insulated gap in the BHA disposed in Well A;
   measuring the magnetic field at a BHA disposed in a Well B;
   determining the position of the BHA disposed in Well A relative to at least one of the Earth's geology and the Earth's geometry;
   determining the position of the BHA disposed in Well B relative to the position of the BHA disposed in Well A; and
   adjusting the trajectory of Well A and the trajectory of Well B to result in a desired parallel placement for the two wells relative to one another.

50. A method for automatically drilling a second well relative to a first well with predetermined distance and placement, comprising:
   measuring a direction and an inclination for a bottomhole assembly (BHA) disposed in a Well A;
   generating a magnetic field at the BHA disposed in Well A by generating a current on an insulated gap in the BHA disposed in Well A;
   measuring the magnetic field at a BHA disposed in a Well B;
   calculating the position of the BHA disposed in Well B relative to the position of the BHA disposed in Well A;
   feeding back the relative positions of the BHAs while manually drilling Well A; and
   performing automated drilling of Well B based on the fed back geometric relationship of the BHAs.

51. The method according to claim 50, further comprising manually adjusting the direction and inclination for the BHA disposed in Well A.

52. The method according to claim 50, wherein feeding back the relative positions of the BHAs comprises providing the relative position of the BHA disposed in Well B relative to the position of the BHA disposed in Well A to a drilling automation device.

53. The method according to claim 50, further comprising tracking manual adjustment of the direction and inclination for the BHA disposed in Well A with automated adjustment to the direction and inclination for the BHA disposed in Well B to achieve a desired placement for the two wells.

54. The method according to claim 50, wherein the desired placement for the two wells is parallel.

55. The method according to claim 50, wherein the desired placement for the two wells is intersection in a U-shape.

56. The method according to claim 50, wherein the desired placement for the two wells is sufficiently separate so as to avoid collision.

57. The method according to claim 50, wherein drilling of Well A and Well B occurs substantially simultaneously.

58. A method for automatically drilling a second well relative to a first well with predetermined distance and placement, comprising:
   measuring a direction and an inclination for a bottomhole assembly (BHA) disposed in a Well B;
   generating a magnetic field at the BHA disposed in Well A by generating a current on an insulated gap in the BHA disposed in Well A;
   measuring the magnetic field at a BHA disposed in a Well B;
   calculating the position of the BHA disposed in Well A relative to the position of the BHA disposed in Well B;
   feeding back the relative positions of the BHAs while manually drilling Well B; and
   performing automated drilling of Well A based on the fed back geometric relationship of the BHAs.

59. The method according to claim 58, further comprising manually adjusting the direction and inclination for the BHA disposed in Well B.

60. The method according to claim 58, wherein feeding back the geometric relationship of the BHAs comprises providing the relative position of the BHA disposed in Well B relative to the position of the BHA disposed in Well A to a drilling automation device.

61. The method according to claim 58, further comprising tracking manual adjustment of the planned trajectory for the BHA disposed in Well B with automated adjustment to the direction and inclination for the BHA disposed in Well A to achieve a desired placement for the two wells.

62. The method according to claim 58, wherein the desired placement for the two wells is parallel.

63. The method according to claim 58, wherein the desired placement for the two wells is intersection in a U-shape.

64. The method according to claim 58, wherein the desired placement for the two wells is sufficiently separate so as to avoid collision.

65. The method according to claim 58, wherein drilling of Well A and Well B occurs substantially simultaneously.

* * * * *